United States Patent [19]

Lang

[11] 3,851,425

[45] Dec. 3, 1974

[54] JIG APPARATUS FOR USE IN STRIPPING INSULATION FROM FLAT MULTI-CONDUCTOR CABLE

[75] Inventor: Roger J. Lang, Garden Grove, Calif.

[73] Assignee: Spectra-Strip Corporation, Garden Grove, Calif.

[22] Filed: Jan. 24, 1973

[21] Appl. No.: 326,285

[52] U.S. Cl. .................................. 51/217, 81/9.51
[51] Int. Cl. ............................................. H02g 1/12
[58] Field of Search .......... 81/9.51; 51/217, 84, 231

[56] References Cited
UNITED STATES PATENTS

| 110,586 | 12/1870 | Nuelle | 51/217 R |
|---|---|---|---|
| 1,936,559 | 11/1933 | William | 81/9.51 X |
| 2,925,005 | 2/1960 | Hensley | 51/217 R |
| 3,346,897 | 10/1967 | Nelson | 51/217 R |
| 3,385,140 | 5/1968 | Carpenter et al. | 81/9.51 |
| 3,421,265 | 1/1969 | Parachek | 51/217 R X |

Primary Examiner—Al Lawrence Smith
Assistant Examiner—Roscoe V. Parker
Attorney, Agent, or Firm—I. Morley Drucker

[57] ABSTRACT

This disclosure is directed to an improved jig apparatus for holding flat multi-conductor electrically insulated cable securely in place while stripping a portion of the insulation therefrom, within extremely close tolerances, at either the ends thereof or at areas intermediate the ends thereof.

10 Claims, 9 Drawing Figures

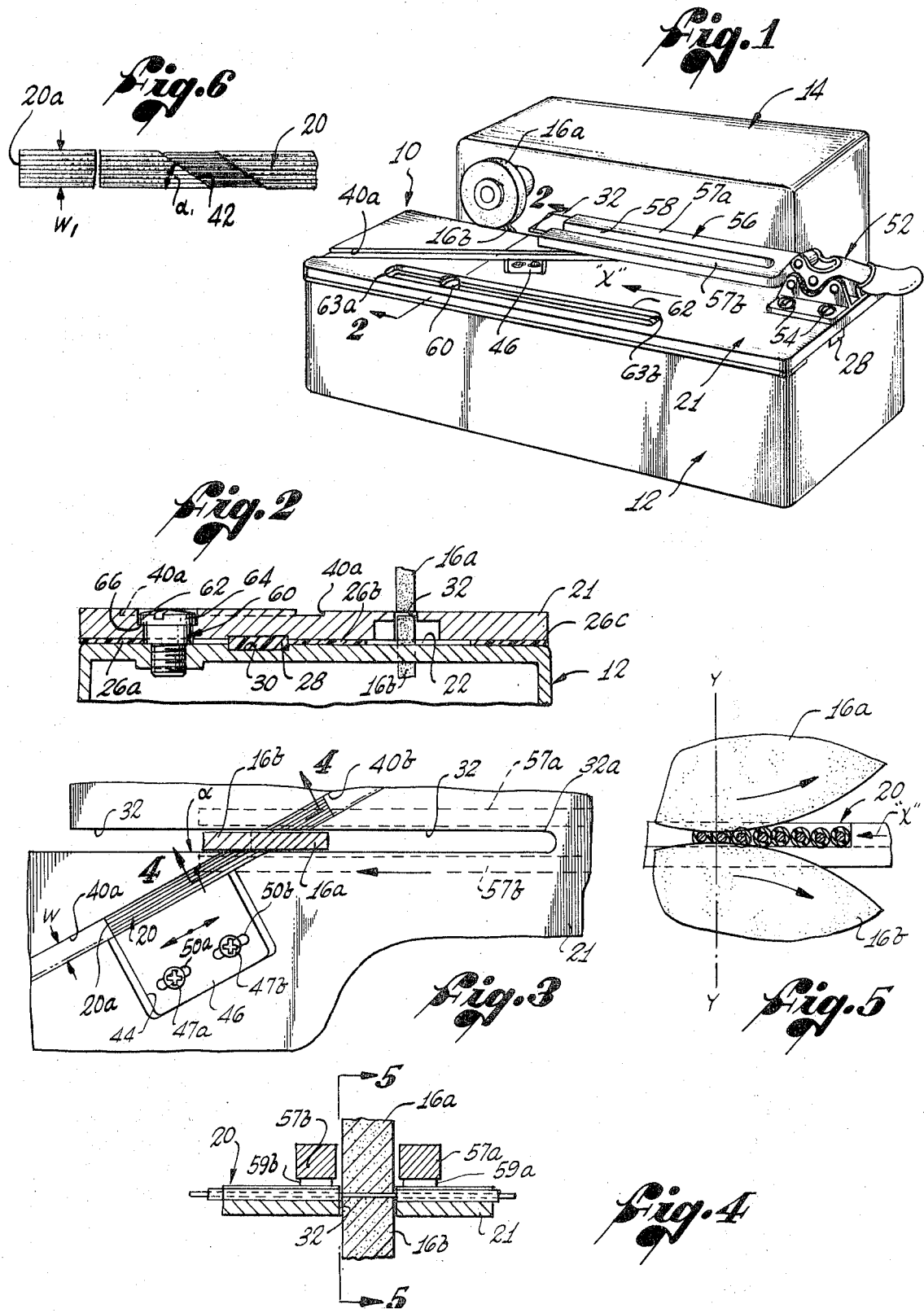

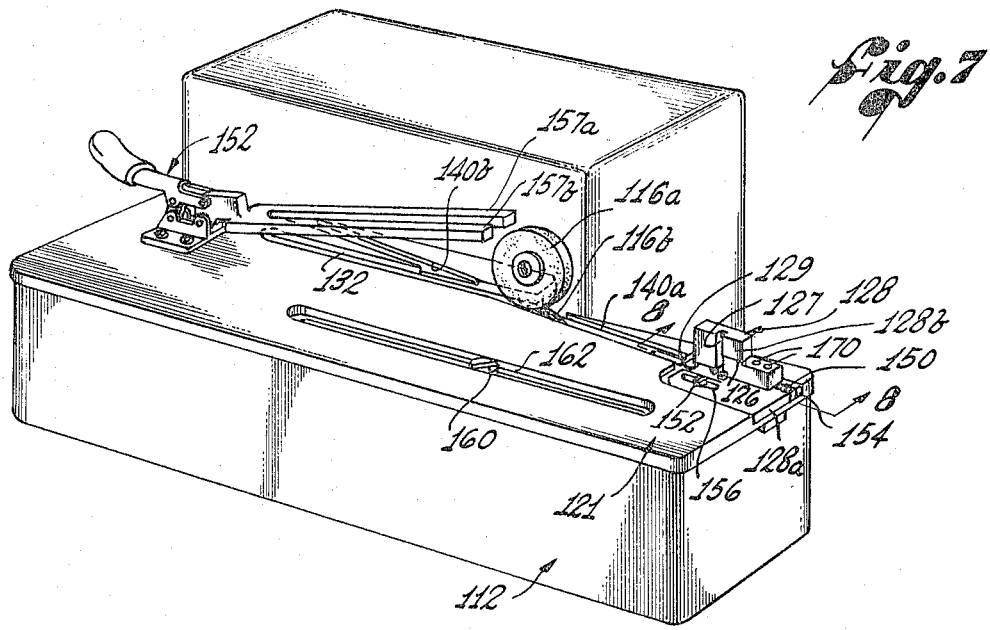
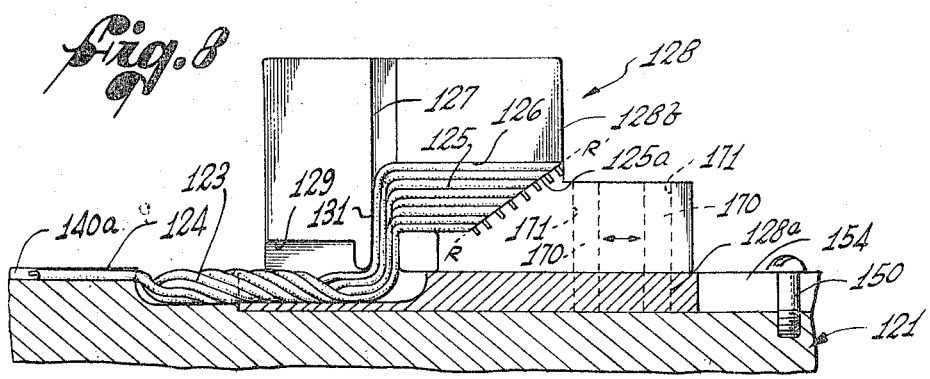
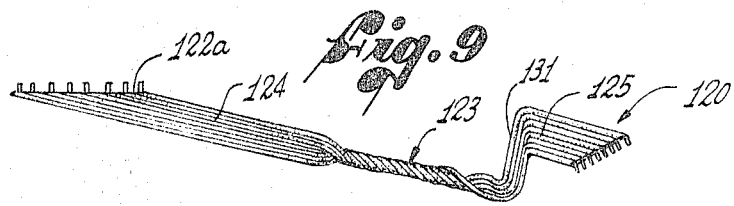

JIG APPARATUS FOR USE IN STRIPPING INSULATION FROM FLAT MULTI-CONDUCTOR CABLE

BRIEF SUMMARY OF THE INVENTION

The improved jig apparatus of this invention enables the extremely accurate and reproducible stripping of insulation from flat multi-conductor cable. The apparatus comprises (a) a means for holding at least a portion of the cable flat, at a desired angle and length, with respect to a given datum or reference line; (b) means for precisely adjusting the position of said cable with respect to said given reference line; and means for stripping the insulation once the cable is held in said predetermined position.

The improved jig apparatus is adapted to slidably move, past the rotatable stripping wheels mounted on fixed axes, so that differing widths of cable insulation can be stripped.

The improved jig apparatus provides a simplified, yet highly advanced, means for extremely accurately stripping insulation from flat cable.

BRIEF DESCRIPTION OF THE DRAWINGS

FIG. 1 is a perspective view of the jig apparatus of this invention shown in combination with a pair of motor-driven, rotatably mounted, stripping wheels;

FIG. 2 is a cross-sectional view taken along the line 2—2 of FIG. 1;

FIG. 3 is a fragmentary top plan view of the jig apparatus, with a flat multi-conductor cable, in place;

FIG. 4 is a cross-sectional view taken along the line 4—4 of FIG. 3;

FIG. 5 is an enlarged, fragmentary, cross-sectional view taken along the line 5—5 of FIG. 4;

FIG. 6 is a top plan view of a length of a flat multi-conductor cable with a portion of the insulation thereof stripped along a predetermined line;

FIG. 7 is a view, in perspective, of a second embodiment, of a jig apparatus of my invention shown in combination with a pair of motor-driven, rotatably mounted, grinding wheels;

FIG. 8 is a fragmentary cross elevational view of the right hand end portion of the jig apparatus shown in FIG. 7 and taken along the line 8—8; and FIG. 9 is a view of a completed cable assembly showing both ends thereof stripped in accordance with the teachings of this invention.

DETAILED DESCRIPTION OF THE INVENTION

Referring to FIG. 1, the jig apparatus 10 of my invention is shown mounted on a work table 12. The work table 12 is preferably (but not necessarily) affixed to an insulation stripper means 14 provided with a pair of rotatable, insulation stripping wheels 16a, 16b. The stripping wheels 16a, 16b are mounted in vertical alignment and one insulation stripper which is useable in combination with the jig apparatus 10 of this invention, is described in Carpenter U.S. Pat. No. 3,385,140, issued on May 28, 1968. The description of the Carpenter U.S. Pat. No. 3,385,140 is herein incorporated by this reference. The spaced-apart vertically in-line stripper wheels 16a, 16b are adjustable in the vertical direction, in order to vary the distance between the upper wheel 16a and lower wheel 16b, depending upon the thickness of the flat cable whose insulation is to be stripped, and are also adjustable in a direction transverse to that of the cable to be stripped.

The type of cable, whose insulation is to be stripped in accordance with the teachings of this invention, is any flat multi-conductor cable, having a plastic insulation wherein the conductors are disposed in side-by-side relationship. Each of the conductors may be individually insulated and then bonded to form the flat cable 20 as shown in FIGS. 5 and 6, and as is taught in U.S. Pat. Nos. 3,005,739 and 3,208,896 (incorporated herein by this reference), or the flat multi-conductor cable may be formed by lamination methods, as taught, for example, in U.S. Pat. No. 3,082,292 (not shown). The cable 20 need not be flat along its entire length, however. It is sufficient if it is flat adjacent the area where is it to be stripped of its insulation.

The jig 10 is preferably made from a generally rectangular, flat, metal plate 21. A suitable metal such as steel is employed. The jig plate 21 is mounted for slidable movement, along the top surface 22 of the work table 12, in the following manner.

Affixed to the underside of jig plate 21 are a plurality of low-friction strips of material 26a, 26b and 26c which, together constitute a low-friction surface. These strips are made preferably of a paper-based phenolic resin are affixed by any suitable adhesive means and extend along the length of plate 21. Also affixed to the underside of jig plate 21 is a low-friction guide strip of material 28, such as Teflon.* Guide strip 28 extends substantially the entire length of the plate 21, and slidably fits within a corresponding U-shaped guide channel 30 formed in the top surface 22 of work table 12. Collectively, guide strip 28 and guide channel 30 constitute a low-friction guide means for jig plate 21. The combination of a low friction surface on the underside of plate 21, together with a low friction guide means 28 enables plate 21 to be readily slidable with respect to work table 12, in both a highly accurate, and reproducible, fashion.

*Teflon is a registered trademark owned by E. I. duPont de Nemours Company.

Plate 21 is mounted for slidable movement in a direction, such that the grinding wheels 16a, 16b will pass through a slot formed in the jig plate 21, as the jig plate is slidably moved along work table 12, as will now be described. The jig plate 21 is provided with an open-ended elongated slot 32, as shown in FIGS. 1-5, which slot 32 terminates within the plate 21 at point 32a. The slot 32 is of sufficient width to accommodate the width of stripping wheels 16a, 16b. The longitudinal axis of the slot 32 runs parallel to the longitudinal axis of guide means 28, 30 so that the jig plate 21 moves in a direction that is along the longitudinal axis of the slot 32, which direction is indicated by the letter X in FIG. 1. The slot 32 and stripping wheels 16a, 16b are positioned with respect to each other so that the stripping wheels will rotate within the slot 32 as the plate 21 is slidably moved past the stripping wheels in the X direction.

Channels or grooves 40a, 40b are formed in the top surface of jig plate 21 on both sides of slot 32, respectively. Channels 40a, 40b extend at a predetermined angle to the slot 32c and form a continuous path having a common longitudinal axis on either side of slot 32, as best seen in FIG. 3. The direction of the longitudinal axis of channels 40a, 40b, determines the angle of the subsequent stripping line 42 (see FIG. 6), the angle $\alpha$, formed between channel 40a and slot 32 being equal to $\alpha_1$ in the flat cable 20 (see FIG. 6). The longitudinal axis of channel 40a, 40b can obviously be varied depending upon the desired angularity of $\alpha_1$.

Channels 40a, 40b, preferably are U-shaped, have a width w, substantially equal to the width $w_1$ of cable 20, and a depth equal to the thickness of the cable; thus cable 20 can be wholly contained within channel 40, except for that portion of cable 20 within slot 32, as seen in FIGS. 3 and 4.

A predetermined, precise distance between the left end 20a of cable 20 and the stripping line 42 can be reproducibly obtained by always aligning the left end 20a of cable 20 with the reference line or edge 44 of an indexing plate 46. When a different distance is desired, set screws 47, 48 holding indexing plate 46 to jig plate 21, (and passing through indexing slots 50a, 50b) can be loosened, and indexing plate 46 moved, as indicated by arrows in either direction to thereby move reference line 44.

In order to firmly clamp cable 20 within channels 40a, 40b during the insulation stripping operation, a bifurcated toggle clamp 52 is affixed to the top of jig plate 21, by screws 54, as shown in FIG. 1. The toggle mechanism of clamp 52 is of conventional construction (one type is manufactured by DE-STA-CO of Detroit, Mich.) The clamping member 56 is provided with an elongated slot 58. When clamping member 56 is laid flat against the top of jig plate 21, the slot 58 thereof is in alignment with the slot 32 in jig plate 21, thereby enabling the grinding wheels 16a, 16b to be passed through slot 32 without any interference by clamping member 56. It will be noted that clamping fingers 57a, 57b of member 56 stably retain the cable 20, on either side of slot 32, by means of rigid projections or resilient pads 59a, 59b affixed to the underside of fingers 57a, 57b (see FIG. 4). The pads 59a, 59b are of lesser dimensions than channels 40a, 40b so that they abut the cable 20 when the clamping member 56 is in locking position. It will be understood that clamping member 52 can assume anyone of a number of configurations while still enabling secure clamping of the cable 20 prior to the stripping operation.

As has been mentioned, jig plate 21 is slidably movable in the direction indicated by the arrow X in FIG. 1. The direction of movement of jig plate 21, X is substantially at right angles to a line Y—Y drawn between the centers of the grinding wheels (see FIG. 5).

Jig plate 21 is held to work table 12 by means of a threaded shoulder bolt 60, passing through an elongated bolt slot 62 formed in the jig plate and thence being threaded into work table 12. Further, the ends 63a, 63b of the bolt slot 62 provide a means for limiting the slidability of the jig plate 21, along work table 12, to a distance equal to the length of bolt slot 62. This is readily accomplished by tightening the bolt 60 only to the extent that the shoulder 64 of the bolt 60 is closely adjacent to, but does not touch, the continuous flange 66 formed within the bolt slot 62. In this way, limited slidable movement of jig plate 21 is provided. The extent of limited movement thus provided is, of course, just slightly less than the distance required for travel of the jig plate 21.

A flat cable 20 cut to the approximate desired length is placed in channels 40a, 40b and across slot 32, with the left end 20a in alignment with reference line 44. During placement of the cable 20 in channels 40a, 40b, clamping member 56 is pivoted away from jig plate 21.

After placement of cable 20, toggle clamp 52 is positioned so that clamping fingers 57a, 57b, and underlying projections 59a, 59b clamp cable 20 securely immediately adjacent slot 32.

Rotatable stripping wheels 16a, 16b can be adjusted laterally, if necessary, to line up precisely with the longitudinal axis of slot 32. The wheels 16a, 16b may also be individually adjusted, vertically, if necessary, so that the distance between the wheels is equal to the conductor diameter within the cable.

The stripping wheels 16a, 16b are then set in rotation, and the jig plate is moved in the X direction to the extent of its travel. The stripping wheels 16a, 16b are thus passed within slot 32 and pass over and under the cable 20 and cleanly strip the insulation from the cable 20, as clearly shown in FIG. 5, along stripping line 42 and angle $\alpha_1$. The jig plate 21 is then returned to its initial position, the clamping member 52 released, and the stripped cable 20 removed.

A second embodiment of the invention is shown in FIGS. 7 and 8. In this embodiment, the left end of a non-linear and non-flat multi-conductor cable 120 is to be stripped along line 122a. The cable 120 has a twisted portion 123 intermediate the ends thereof, and has a first flat area 124 at the left side of twisted portion 123, and a second flat area 125 at the right side of the twisted portion 123, which second flat area is at right angles to the left hand flat area 124.

In order to precisely strip the cable 120, along line 122a, the right hand portion 125 is first securely clamped or held in a vertical position within generally conforming cavities 126, 127 formed in a metal die or block 128. The right hand portion 125 is precisely held within the block 128 by aligning stripping line 125a with a reference line R–R' on block 128 or by aligning the left hand edge 131 of flat area 125 with the left hand edge of cavity 127.

The metal block 128 is affixed to jig plate 121, at one end of a channel 140, by screws 150, 152. The screws 150, 152 pass through elongated slots 154, 156 and are threaded into jig plate 121. Upon loosening of screws 150, 152, the metal block 128 is movable in either of the directions indicated by the double arrow, in FIG. 8, and thereby a fine adjustment of the right hand stripping line 125a, or other reference line such as cable edge 131, with respect to the left hand stripping line 122a, is achieved.

After the right hand portion 125a of cable 120 is secured within the cavities 126, 127 of block 128, and block 128 is finely adjusted, as described, the twisted area 123 of the cable is placed within an additional cavity 129 of block 128, and the left hand flat portion 124 is laid within channel 140a, and across a slot 132, the left hand portion 124 terminating in channel 140b. Channels 140a, 140b form a continuous path, as do channels 40a, 40b, and these channels 140, 140b are shaped similarly to channels 40a, 40b of the first embodiment of this invention, heretofore described, and closely confine the cable 120 except where the cable crosses slot 132. The angularity of the channels 140a, 140b with respect to slot 132 is predetermined in accordance with the desired angle of stripping line 122a.

A bifurcated toggle clamp 152, having a pair of clamping fingers 157a, 157b, securely clamps the cable 120, as described with reference to the first embodiment of this invention, just prior to the stripping operation. The toggle clamp 152 is shown in its released or non-clamping position in FIG. 7.

The jig plate 121 is mounted on a work table 112 for slidable movement in the direction of the longitudinal axis of slot 132 as described with reference to FIGS. 1-6. The rotatable stripping wheels 116a, 116b are moved within the slot 132 (as jig plate 121 is slidably moved) to strip the cable 120 along desired stripping line 122a, in the manner heretofore described with reference to FIGS. 1-6. The limits of slidable movement are dictated by the length of a bolt slot 162. A shoulder bolt 160, affixed to work table 112, and mounted within slot 162, limits movement as heretofore described with reference to FIGS. 1-6.

The vertical extension 128a of block 128 in which the cavities 126, 127 and 129 are formed is preferably made separable from the adjustable portion or plate 128b of block 128 and, may be secured to plate 128 by pins 170 (see FIGS. 7 and 8) closely fitting within corresponding grooves 171 formed in extension 128a.

Tolerances obtained on a regular production basis utilizing the method and means of the present invention, are less than ±1/100 of an inch and ±2°.

Modifications of the preferred embodiments described herein may be employed which will be obvious to those skilled in the art. For example, different cable clamping means may be employed than shown herein; and other ways of effecting accurate sliding movement of the jig plate relative to the insulation stripping means. For these reasons, I intend to be bound only by the claims which follow.

I claim:

1. In a jig apparatus, adapted for stripping insulation from insulated multi-conductor cable by means of rotatable, spaced-apart vertically-in-line stripping wheels, the improvement which comprises:
    a jig plate longitudinally movable, in a given direction, with respect to said stripping wheels;
    an elongated slot provided in said jig plate within which said stripping wheels can rotate as said jig plate is moved;
    channel means formed on either side of said slot, said channel means aligning said cable whose insulation is to be stripped with respect to a given reference line; and
    means for releasably clamping said cable in said channel means so that said cable is held flat in said slot as said stripping wheels are passed through said slot and strip insulation from said cable, and which clamping means are releasable after said stripping of insulation has been completed.

2. The jig apparatus of claim 1 wherein said jig plate is mounted for slidable movement on a work table and the underside of said jig plate is provided with a low-friction surface.

3. The jig apparatus of claim 1 which includes a positive limiting means for movement of said jig plate relative to said stripper wheels.

4. The jig apparatus of claim 1 wherein said clamping means is attached to said jig plate and includes a pair of clamping fingers adapted to abut portions of the cable immediately adjacent said slot.

5. The jig apparatus of claim 1 which includes an adjustable indexing means affixed to said jig plate.

6. The jig apparatus of claim 1 which includes a second cable clamping and indexing means for precisely holding a portion of the cable remote from the area to be stripped, said second cable clamping means being adjustably mounted to said jig plate.

7. The jig apparatus of claim 6 wherein said second cable clamping means includes cavity means conforming to the said portion of the cable being clamped therein.

8. The jig apparatus of claim 2 wherein said jig plate is mounted for movement to a work table, and said positive limiting means includes an elongated bolt slot formed within said jig plate in combination with a shoulder bolt passing through said bolt slot and releasably attached to said work table to limit movement of said jig plate.

9. The jig apparatus claim 1 wherein said channel means is of such dimension as to contain therewithin the cable whose insulation is to be stripped.

10. In a jig apparatus, adapted for stripping insulation from insulated multi-conductor cable by means of rotatable, spaced-apart vertically-in-line stripping wheels, the improvement which comprises:
    a jig plate longitudinally movable, in a given direction, with respect to said stripping wheels;
    an elongated slot provided in said jig plate within which said stripping wheels can rotate as said jig plate is moved;
    cable alignment means formed on either side of said slot, said cable alignment means aligning said cable whose insulation is to be stripped with respect to a given reference line; and
    means for releasably clamping said cable in said cable alignment means so that said cable is held flat in said slot as said stripping wheels are passed through said slot and strip insulation from said cable, and which clamping means are releasable after said stripping of insulation has been completed.

* * * * *